(12) United States Patent
White

(10) Patent No.: US 7,232,069 B1
(45) Date of Patent: Jun. 19, 2007

(54) METHODS AND APPARATUS FOR DISABLING, ENABLING OR SETTING THE RANGE OF RADIO FREQUENCY IDENTIFICATION DEVICES

(75) Inventor: Daniel Frederick White, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 219 days.

(21) Appl. No.: 10/869,556

(22) Filed: Jun. 16, 2004

(51) Int. Cl.
*G06K 7/08* (2006.01)

(52) U.S. Cl. ...................... 235/451; 235/380
(58) Field of Classification Search .............. 235/451, 235/492, 487, 380, 385
See application file for complete search history.

(56) References Cited

U.S. PATENT DOCUMENTS

| | | | |
|---|---|---|---|
| 6,173,899 B1 * | 1/2001 | Rozin ......................... | 235/492 |
| 6,202,927 B1 * | 3/2001 | Bashan et al. .............. | 235/451 |
| 6,726,099 B2 * | 4/2004 | Becker et al. .............. | 235/380 |
| 6,840,440 B2 * | 1/2005 | Uozumi et al. ............. | 235/375 |
| 6,840,455 B2 * | 1/2005 | Norton ....................... | 235/492 |
| 7,119,738 B2 * | 10/2006 | Bridgelall et al. .......... | 342/129 |
| 2003/0057279 A1 * | 3/2003 | Uozumi et al. ............. | 235/451 |
| 2003/0104848 A1 * | 6/2003 | Brideglall ................... | 455/574 |
| 2004/0069852 A1 * | 4/2004 | Seppinen et al. ........... | 235/451 |
| 2004/0124248 A1 * | 7/2004 | Selker ........................ | 235/492 |
| 2005/0110612 A1 * | 5/2005 | Carrender .................. | 340/10.1 |
| 2006/0071790 A1 * | 4/2006 | Duron et al. .............. | 340/572.1 |
| 2006/0108421 A1 * | 5/2006 | Becker et al. .............. | 235/451 |
| 2006/0124738 A1 * | 6/2006 | Wang et al. ................ | 235/385 |

* cited by examiner

*Primary Examiner*—Thien M. Le
*Assistant Examiner*—Edwyn Labaze
(74) *Attorney, Agent, or Firm*—Priest & Goldstein, PLLC; Paul Martin

(57) ABSTRACT

Systems and techniques for control of RFID devices. An RFID device has an antenna connected with a switch or switches whose states can be changed so as to disable or reduce the effective range of the antenna. The RFID device includes a transceiver that uses the antenna to carry on communications with an RFID reader. The transceiver can set the states of switches in order to set the reader to a desired state. The reader is capable of issuing commands to the RFID device, acted on by the transceiver in order to set states of switches in order to achieve a desired state for the RFID device. The reader may issue commands through RF communication, or alternatively may issue commands through a close proximity interface, for example through contacts or through an inductive connection, allowing the state of the device to be reset after the RF capability of the device has been disabled or reduced.

26 Claims, 4 Drawing Sheets

METHODS AND APPARATUS FOR DISABLING, ENABLING OR SETTING THE RANGE OF RADIO FREQUENCY IDENTIFICATION DEVICES

FIELD OF THE INVENTION

The present invention relates generally to improvements to radio frequency identification (RFID) systems used for control of goods. More particularly, the invention relates to systems and techniques for disabling, enabling or setting the range of an RFID device such as an RFID tag, for example after a transaction involving goods identified by the tag has been completed or after the return to a retailer of goods bearing a previously disabled RFID tag.

BACKGROUND OF THE INVENTION

Radio frequency identification (RFID) systems offer the possibility of inexpensive and efficient management of goods, with applications in inventory control and retail checkout. Each item in an inventory, for example in a retail store or a warehouse, may be equipped with an RFID tag, that is, a tag containing an RFID emitter that supplies information about the product to an RFID reader. The information may include product identification information, such as manufacturer and item identifiers, similar to those provided by a standard universal product code bar code. The information may also include a unique serial number or other unique identifier, so that each individual item may be easily identified by a reader or readers and the movements of identified items may be tracked. Typical RFID readers broadcast an RF signal. Tags within the range of the reader return a signal to the reader, typically in the form of modulated backscatter of the signal emitted by the reader.

A reader may be placed at a desired inventory control point, such as a retail checkout station or an entrance to or exit of a retail location, warehouse or other area where goods are located. Tags coming within range of the reader are powered by the reader's RF signal and transmit tag information which is detected by the reader. The information detected by the reader may be used in operations, such as purchase transactions, involving the item or items whose information was detected. Such operations may include entry of a product into a transaction or logging the entry of an item into or the exit of an item from a retail location, warehouse or other controlled environment.

The use of RFID devices for management of goods offers possibilities of fast and efficient control of goods. For example, a customer might bring a cart full of goods bearing RFID tags to a terminal, which would include a reader receiving product identification information for each product. The terminal would retrieve product information, such as price or descriptive information for each product. The terminal would then enter product information for each product into a transaction and present the customer with a list of goods in the transaction and a transaction total. The customer would then tender payment, the transaction would be recorded and the goods would be removed from the retailer's inventory records.

In another application, a warehouse inventory could be continuously updated by one or more RFID readers located in the warehouse and continually sensing RFID signals from goods located in the warehouse. An RFID reader located at an entry or exit point of a location could record the passage of goods through that location, and could secure the entry or exit point to prevent the exit of an item if the item was not properly entered into the transaction.

The use of RFID tags for management of goods can be expected to allow for a significant reduction in the labor required to enter transactions and to prevent the unauthorized removal of goods. If each item transmits an identifying code that can be detected by a reader, tracking and control of the item may be performed automatically. However, many customers have serious privacy concerns at the prospect of a tag that can transmit identifying information at a considerable distance from the tag. The use of such tags raises a possibility that goods owned by a customer could be identified by someone who had no legitimate need for the information. It is possible that RFID product identification could be used in highly intrusive ways. For example, a marketer or other person could conceivably install an RFID reader in a public place, and identify goods owned by unknowing passersby. If unaddressed, privacy concerns might seriously inhibit customer acceptance of retail use of RFID systems.

For best and most versatile use, an RFID tag used in a retail environment should be able to communicate information over a fairly great distance, at least several feet or perhaps tens of feet. Such communication ranges allow for relatively wide coverage for a reader used for transactions or security and allow for relatively unobtrusive placement of readers, for example in a relatively high ceiling. However, after a product has been paid for and left the retail establishment, the retailer no longer needs to track or monitor the product, and the product does not need to be able to communicate over such distances.

There exists, therefore, a need for systems and techniques for RFID communication that allow for an RFID tag to be disabled, or its communication range reduced, when the tracking or monitoring of a product associated with the tag is no longer required.

SUMMARY OF THE INVENTION

A system according to an aspect of the present invention employs RFID devices having antennas including switches whose states can be changed so as to disable or reduce the effective range of the antenna. Each of the RFID devices includes a transceiver that uses the antenna to carry on communications with an RFID reader, which may be one of a plurality of readers deployed in an installation. The transceiver is capable of setting the states of switches in order to set the antenna to a desired state. The switches may be irreversible, in which case a switch cannot be set to an original state after its state has been changed, or may be reversible, in which case a switch can be restored to a previous state. Each reader is capable of issuing commands to the RFID device, which are acted on by the transceiver in order to set states of switches in order to achieve a desired state for the RFID device. The reader may issue commands through RF communication, or alternatively may issue commands through a close proximity interface, such as, for example, through contacts or through an inductive connection, allowing the state of the device to be set after the RF capability of the device has been disabled or reduced.

A more complete understanding of the present invention, as well as further features and advantages of the invention, will be apparent from the following Detailed Description and the accompanying drawings.

DETAILED DESCRIPTION

Figure 1:
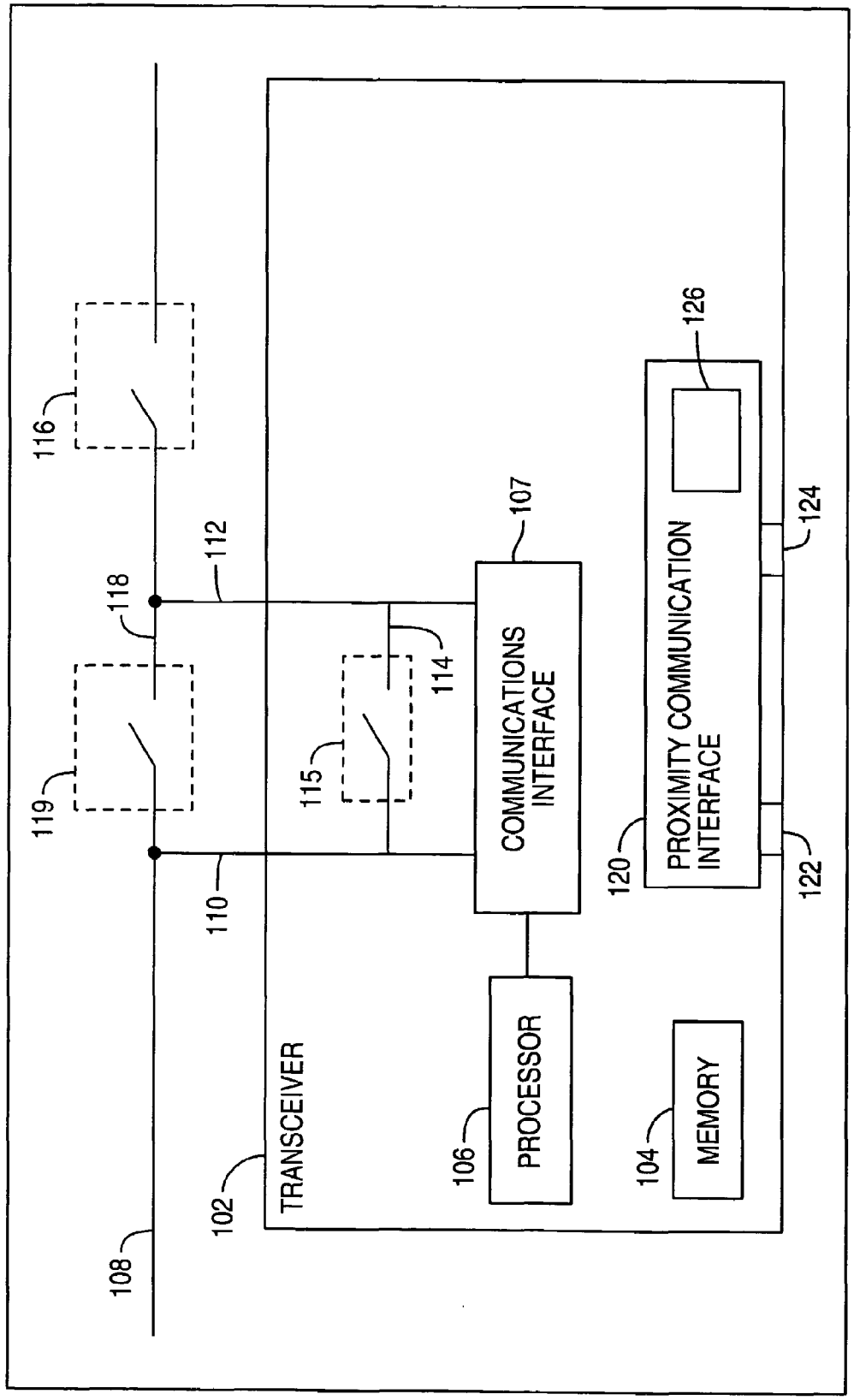
FIG. 1 illustrates an RFID tag according to an aspect of the present invention.

FIG. 1 illustrates an RFID tag 100 according to an aspect of the present invention. The tag 100 comprises an information transceiver 102, comprising memory 104 for storing information to be communicated, a processor 106 for reading the memory 104 and formatting a transmission for communication, and a communications interface 107 for producing an RF signal for transmission. The transceiver 102 is connected to an antenna 108 through first and second antenna connections 110 and 112.

The RFID tag 100 receives power from a radio frequency (RF) field emitted by an RFID reader (not shown in FIG. 1, but discussed below and illustrated in FIGS. 2 and 3). The transceiver 102 modulates the signal received at the antenna 108 and communicates with the reader through a modulated backscatter signal emitted using the antenna 108. While the tag 100 is described as a passive tag communicating with an RFID reader through modulated backscatter of a field emitted by the reader, it will be recognized that other designs for RFID tags may be used. For example, an RFID tag may include an active transmitter powered by a battery incorporated into the tag. The teachings of the present invention may easily be adapted for use with such a tag, or for use with other designs of RFID tags.

The range of the RFID tag 100 depends on factors including the effective length of the antenna 108. The antenna connections 110 and 112 must have an open circuit between them in order for the antenna 108 to emit a signal that conveys information. That is, the antenna connection 110 must connect to the antenna 108 and the antenna connection 112 must connect to the antenna 108, but a connection directly between the antenna connections 110 and 112 shorts the connections and disables the transmission capability of the device 100.

Therefore, the RFID tag 100 includes a shorting connector 114 between the antenna connections 110 and 112. The shorting connector 114 includes a switch 115. When the switch 115 is closed, a short is present between the connections 110 and 112 and the antenna 108 is unable to transmit. When the switch 115 is open, the connections 110 and 112 are isolated from one another and the antenna can operate normally. The switch 115 is controllable by the transceiver 102.

The shorting connector 114 and the switch 115 may suitably be incorporated into the transceiver 102. The transceiver 102 will typically be embodied as an integrated circuit, and the switch 119 can easily be incorporated into the design of such a circuit at a very low cost per unit.

The RFID tag may also include a switch 116, placed at a selected point on the antenna 108. Opening the switch 116 reduces the effective length of the antenna 108 and reduces the effective range of the RFID tag 100. The precise reduction of range that is achieved by opening the switch 116 depends on the placement of the switch 116. It will be recognized that the tag 100 may include the combination of the connector 114 with the switch 115, the switch 116, or both of these elements. If only a capability to completely disable the transmission capability of the tag 100 is required, only the combination of the connector 114 with the switch 115 is needed. If only the capability to reduce the range of the tag 100 is required, only the switch 116 is needed. It will also be recognized that additional switches may be incorporated into the tag 100, if it is desired to select from among several different antenna lengths and, therefore, ranges for the tag 100.

As an alternative, or in addition, to the combination of the connector 114 and the switch 115 incorporated into the transceiver 102, the tag 100 may include a connector 118 and a switch 119, external to the transceiver 102. Depending on the particular uses to which the tag 100 is to be put, the switches 115, 116, 118 and any other switches incorporated into the tag 100, may be reversible or irreversible. If the switches are irreversible, they cannot be restored to a previous state once their state has been changed, and changing the states of the switches permanently disables the tag 100 or permanently reduces its range. Alternatively, a switch may be able to be restored to a previous state at some point after its state has been changed, for example, if a product bearing the tag 100 has been returned by a customer and returned to stock. In such a case, restoring switches to a previous state restores the tag 100 to its original state, restoring its original transmission ability and range.

The switches 115, 116, 118 and similar switches that may be incorporated into the tag 100 are controlled by commands issued by the transceiver 102. Each of the switches may have an address and recognize commands issued to that address. The processor 106 formats a command and transmits it using the input/output connections 108 and 110. The addressed switch recognizes and acts on the command. The command may be protected by a password or encryption message to prevent inadvertent or hostile attempts to disable the tag 100.

The tag 100 may suitably receive switch commands transmitted by an RF signal, for example, a signal transmitted by a reader. In that case, the transceiver 102 receives the signal through the input/output connections 108 and 110 and processes the signal to extract the command.

Once the state of one of the switches 115, 116, 118 or a similar switch has been changed so as to disable the tag 100 or reduce its range, the RF communication capability of the tag 100 is disabled or impaired. For this reason, and to give the tag 100 additional communication capabilities, the tag 100 may suitably be provided with a proximity communication interface 120. The interface 120 may suitably include contacts 122 and 124. Commands may be issued to and information received from the tag 100 by touching the contacts 122 and 124 against a suitable surface of an RFID reader. In addition or as an alternative to the contacts 122 and 124, the interface 120 may include an inductive connection 126, allowing the tag 100 to receive commands and provide information to an RFID or other suitable device at a range of a few inches. In this way, the tag 100 can be disabled sufficiently to prevent any privacy concerns, while still retaining the ability to be re-enabled, and to provide information in a retail environment even if its RF capability is disabled.

Figure 2:
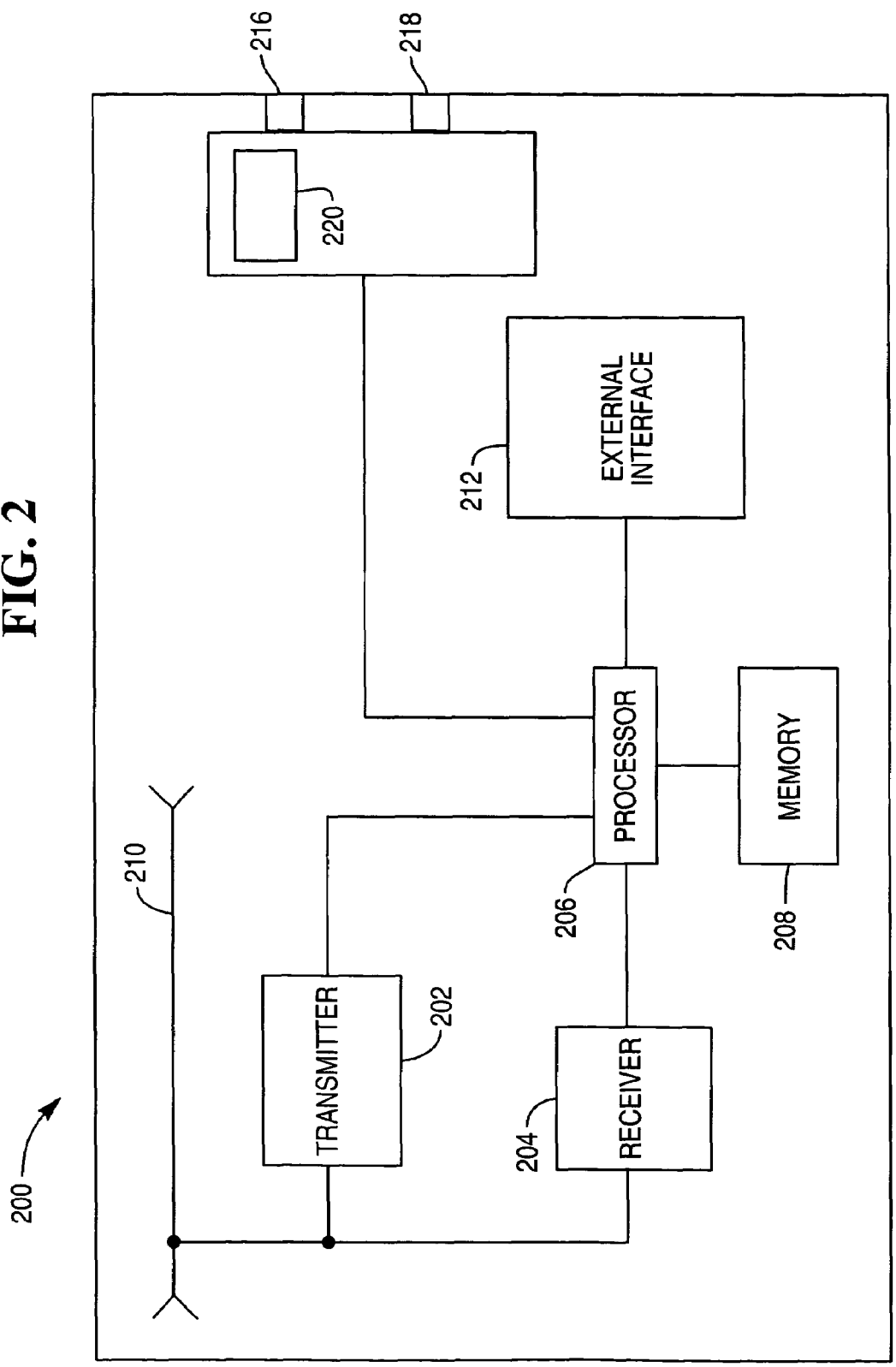
FIG. 2 illustrates an RFID reader according to an aspect of the present invention.

FIG. 2 illustrates an RFID reader 200 according to an aspect of the present invention. The reader 200 includes a transmitter 202, a receiver 204, a processor 206, memory 208 and an antenna 210. The reader 200 uses the transmitter 202 to broadcast an RF signal to RFID tags in its vicinity, in order to provide power to the tags and, if desired, issue commands to the tags. The reader 200 uses the receiver 204 to receive transmissions from tags within its vicinity. The transmissions preferably follow a prescribed format for the transmission of digital information and include information such as a product identifier and a tag serial number.

The processor 206 and the memory 208 are used to manage operation of the reader 200, to prepare signals and commands to be sent using the transmitter 204 and to interpret signals received using the receiver 204 and to extract and store information provided by the signals. The reader 200 also includes an external interface 212, for communicating with other devices in an establishment where the reader 200 is used. The reader 200 may suitably be used in and receive commands from a terminal (not shown here, but discussed below and illustrated in FIG. 3) used to perform retail transactions. In such an implementation, the reader 200 receives commands from the terminal through the external interface 212.

When an RFID tag is to be disabled or is to be subject to range reduction, the reader 200 sends an appropriate signal to the tag, instructing the tag to open or close switches as appropriate to perform the desired operation. The signal may suitably include the specific identification of the RFID tag on which the operation is to be performed, in order to avoid unintentional disabling or range reduction of other tags.

The reader 200 further includes an RFID tag disabling interface 214, to allow disabling or reducing the range of a tag without sending an RF signal to the tag. The tag disabling interface 214 receives instructions from the processor 206 and transmits commands through contacts 216 and 218, through an inductive connection 220, or both. It will be recognized that a reader such as the reader 200 may include the set of contacts 216 and 218, the inductive connection 220 or both, depending on the particular capabilities desired. It will also be recognized that other techniques may be used to give the reader 200 the capability to communicate with an RFID tag through direct contact or short range communication.

Figure 3:
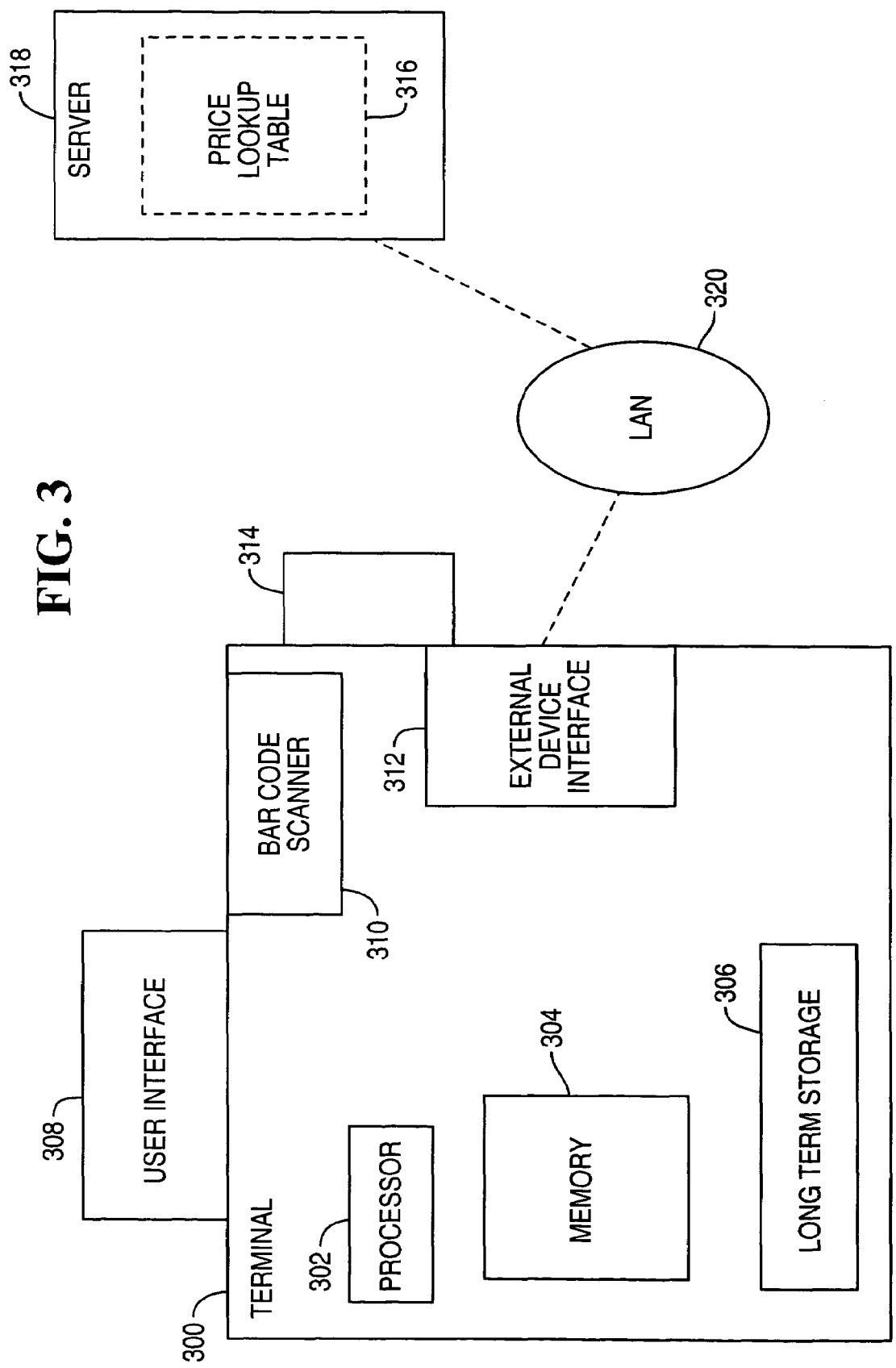
FIG. 3 illustrates a transaction terminal according to an aspect of the present invention.

FIG. 3 illustrates a terminal 300 according to an aspect of the present invention. The terminal 300 may be operated in a retail establishment employing the terminal 300 and a plurality of similar terminals, a plurality of RFID readers employed at entrances and exits to provide security, and various other facilities for performing transactions and controlling and tracking the movement of goods.

The terminal 300 suitably includes a processor 302, memory 304, long term storage 306, a user interface 308, bar code scanner 310 and an external device interface 312. The terminal 300 is preferably adapted to accept user inputs from the user interface 308 and receive information, commands and programming from the external device interface 312. The terminal 300 includes an RFID reader 314, similar to the reader 200 of FIG. 2. The reader 314 receives product identification information from RFID tags attached to products, the RFID tags being similar to the tag 100 of FIG. 1. Once the terminal 300 has received identification information from an RFID tag, the terminal 300 can obtain product information through the external device interface 312, for example from a price lookup table 316 hosted on a server 318 accessible through a local area network 320. If a product lacks an RFID tag, the bar code scanner 310 or the user interface 308 may be used to enter product identification information.

Once a purchase transaction is complete, the terminal 300 suitably performs operations on RFID tags associated with goods in order to disable or reduce the range of the tags. The operations are preferably performed according to preprogrammed instructions, suitably stored in the long term storage 306 or memory 304, in order to avoid errors or omissions by a customer or checker and to provide for a quick and efficient operation. The processor 302 issues appropriate commands to the reader 314, and the reader operates in a manner similar to that of the reader described above and illustrated in FIG. 2.

If a product bearing a disabled RFID tag is returned and is to be returned to stock, the terminal 300 may suitably be used to re-enable the RFID tag. In such a case, the terminal 300 is typically operated by an employee of the establishment after the customer has returned the product. The user interface 308 is employed to instruct the reader 314 to issue appropriate commands to the RFID tag, and the reader 314 operates to re-enable the tag in a manner similar to that described above in connection with FIG. 2.

Figure 4:
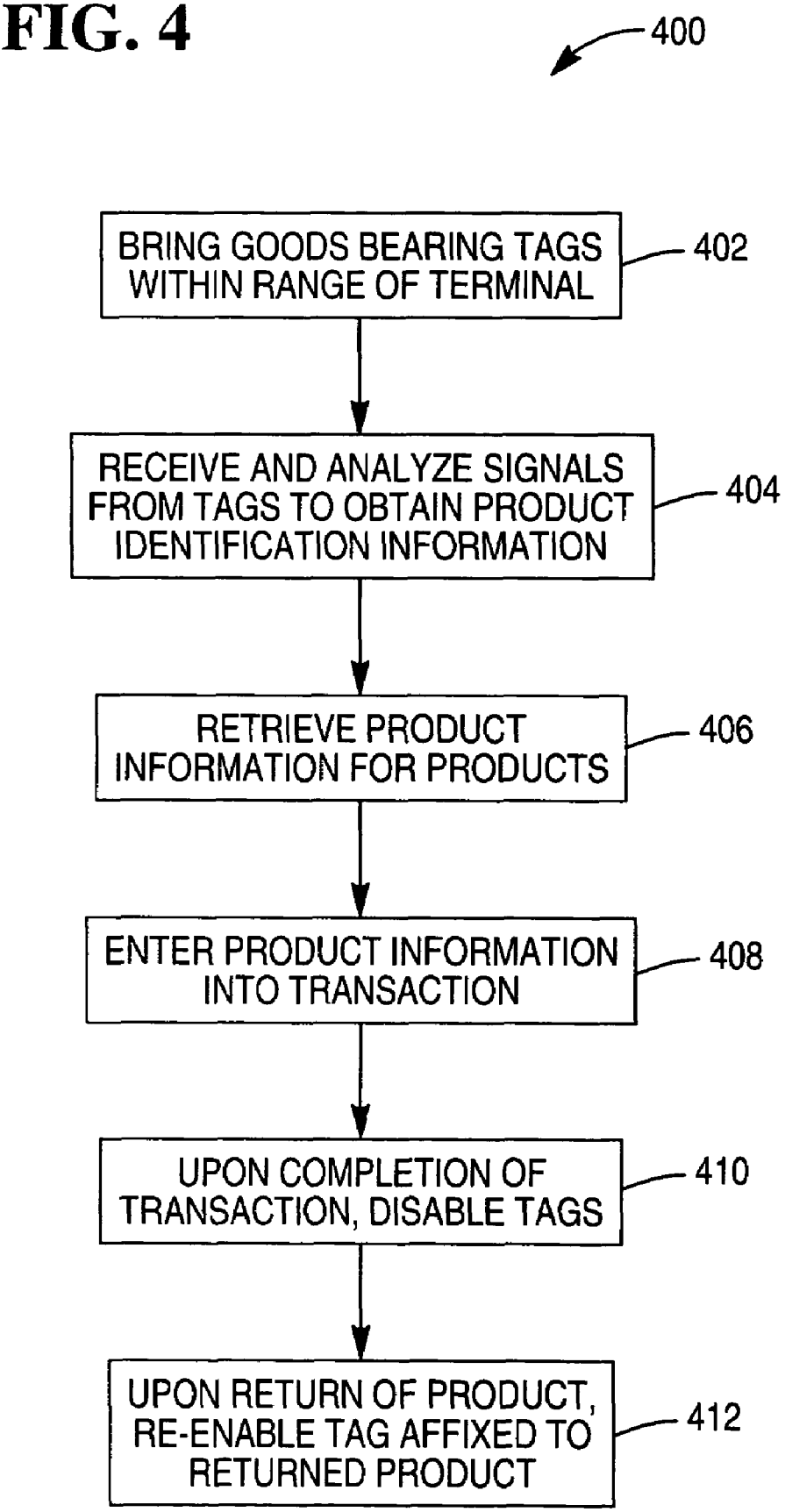
FIG. 4 illustrates a process of transaction management and control of goods according to an aspect of the present invention.

FIG. 4 illustrates a process 400 of transaction management and control of goods according to an aspect of the present invention. At step 402, a collection of goods bearing RFID tags is brought within the range of an RFID reader associated with a transaction terminal. The tags may suitably be similar to the tag 100 of FIG. 1 and the reader may suitably be similar to the reader 200 of FIG. 2. At step 404, signals emitted by the tags are received and analyzed to obtain product identification information for products associated with the tags. At step 406, product identification information obtained from the signals used to retrieve product information, such as price information and product descriptions. At step 408, the product information for each product is entered into a transaction. At step 410, upon completion of the transaction, each tag associated with a product entered into the transaction is disabled as described above in connection with FIGS. 1 and 2. Depending on the design and operation of the tags and readers, the tags may be completely disabled or may be subject to a range reduction. In addition, it is possible to operate on all tags associated with products entered into the tags or only on a selection of tags, depending on operational choices. For example, a consumer may be given the opportunity to make general or specific selection in order to determined what operations will be performed on which tags, for example disabling some tags, reducing the range of some tags and leaving some tags in their original state. Which operations are performed on which tags can be left up to the consumer or may be decided by other, predetermined criteria.

RFID tags used in a transaction may be so designed that they can be restored to a previous state after their state has been changed. In the case of retail sales, particularly, return of a product from a customer is commonly accepted, and if the product is returned unused or in suitable condition, it may be returned to stock. At step 412, upon return of a product from a customer, with the product bearing an RFID tag capable of being restored to a previous state, the tag is restored to the previous state using the techniques described above in connection with FIGS. 1, 2 and 3.

While the present invention is disclosed in the context of a presently preferred embodiment, it will be recognized that a wide variety of implementations may be employed by persons of ordinary skill in the art consistent with the above discussion and the claims which follow below.

I claim:

1. A radio frequency identification (RFID) device for receiving and emitting RFID signals, comprising: a transceiver for transmitting an outgoing transmission providing information that can be detected and interpreted by an RFID reader; an antenna for emitting the outgoing transmission in the form of radio frequency (RF) signals; and a control switch utilized to change an effective length of the antenna so as to alter a range of the antenna when set to appropriate states, the control switch being operative to take on states in response to commands received from the transceiver.

2. The RFID device of claim 1, wherein the transceiver issues commands to set the state of the control switch based on switch state commands received from an RFID reader.

3. The RFID device of claim 2, wherein the transceiver receives switch state commands from the reader in the form of radio frequency signals emitted by the reader.

4. The RFID device of claim 3, further comprising a proximity communication interface, and wherein the transceiver is also able to receive switch state commands from the reader through the proximity communication interface.

5. The RFID device of claim 4, wherein the proximity communication interface includes one or more external contacts, allowing the reader to issue switch state commands through the contacts.

6. The RFID device of claim 5, wherein the proximity communication interface includes an inductive connection, allowing the reader to issue switch state commands through the inductive connection.

7. The RFID device of claim 6, wherein the control switch is placed so as to enable or disable the antenna depending on the state of the control switch, and wherein the state of the control switch is set based on switch state commands received from the reader.

8. The RFID device of claim 7, wherein the control switch is placed so as to achieve a greater or lesser effective range for the antenna depending on the state of the control switch, and wherein the state of the control switch is set based on switch state commands received from the reader.

9. The RFID device of claim 5, wherein the device includes one or more additional switches that can be used separately or in combination with one another or with the control switch to enable or disable the antenna or to set a desired range for the antenna, depending on the states of the various switches, and wherein the state of each of the switches is set based on switch state commands received from the reader.

10. The RFID device of claim 5, wherein the transceiver receives an incoming signal from the reader and wherein the outgoing transmission is in the form of modulated backscatter of the incoming signal.

11. The RFID device of claim 5, wherein the outgoing transmission is sent as an active transmission from the RFID device, independently of an incoming signal from the reader.

12. A radio frequency identification (RFID) reader for communicating with RFID devices, comprising: a transmitter for transmitting radio frequency (R.F) signals to the RFID devices; a receiver for receiving RF signals from the RFID devices; and a processor for extracting information from signals received from the RFID devices and for preparing commands for transmission to the RF/D devices, the processor being operative to issue commands to an RFID device to alter an operational capability of the device by changing an effective length of an antenna employed by the device so as to change the a range of the antenna.

13. The RFID reader of claim 12, wherein the commands to alter the operational capability of a device include a command to disable the device.

14. The RFID reader of claim 13, wherein the commands to alter the operational capability of a device include a command to reduce the range of the device.

15. The RFID reader of claim 14, wherein the commands to alter the operational capability of a device include a command to re-enable a disabled device.

16. The RFID reader of claim 15, wherein the commands to alter the operational capability of a device include a command to restore the original range of a device whose range has been previously reduced.

17. The RFID reader of claim 16, wherein the commands to alter the operational capability of a device direct the setting of states of switches in the device in order to carry out the commands.

18. The RFID reader of claim 17, wherein the receiver is capable of transmitting a command to a device through RF communication with the device.

19. The RFID reader of claim 18, further comprising an RFID command interface for communicating commands to an RFID device without RF transmissions to the device.

20. The RFID reader of claim 19, wherein the RFID command interface includes contacts for communicating commands to an RFID device through corresponding contacts of the RFID device.

21. The RFID reader of claim 20, wherein the RFID command interface includes an inductive interface for communicating commands to an RFID device through an inductive coupling with the device.

22. A radio frequency identification (RFID) reader for communicating with RFID devices, comprising: a transmitter for transmitting radio frequency (RF) signals to the RFID devices; a receiver for receiving RF signals from the RFID devices; and a processor for extracting information from signals received from the RFID devices and for preparing commands for transmission to the RFID devices, the processor being operative to issue commands to an RFID device to alter an operational capability, the commands issued by the processor including commands to alter an effective length of the device and including commands to disable the device and to reduce the range of the device.

23. A transaction terminal for performing retail transactions, comprising: a user interface allowing inputs from a user; an external interface for receiving information needed to conduct a transaction and for communicating information relating to a pending or completed transaction; and a radio frequency identification (RFID) reader for receiving signals from an RFID device, the reader being operative to extract product information from an RFID signal, the reader being further operative to communicate commands to an RFID device to alter an operational capability of the device by changing an effective length of an antenna employed by the device so as to change a range of the antenna, once a transaction involving a product associated with the device has been completed.

24. The terminal of claim 23, wherein the reader is further operative to restore an RFID device to a previous operational state upon an appropriate command by a user.

25. A method of management and control of goods; comprising the steps of: receiving product identification information from RFID devices associated with products; using the product identification information to retrieve product information; entering the product information into a transaction; and upon completion of the transaction, issuing a command from a remote reader to the RFID device to set specified operational characteristics providing for reduced performance, the command being implemented through setting of one or more switches within the RFID device to appropriate states in response to the command, in order to set desired an effective length of an antenna employed by the device in order to achieve the specified operational characteristics.

26. The method of claim 25, further comprising a step of issuing a command to an RFID device to restore the device to a normal operational state upon return of a product bearing the device.

* * * * *